United States Patent
Fan et al.

(10) Patent No.: US 7,420,977 B2
(45) Date of Patent: Sep. 2, 2008

(54) METHOD AND APPARATUS OF INTER-CHIP BUS SHARED BY MESSAGE PASSING AND MEMORY ACCESS

(75) Inventors: Jason Fan, Hsinchu (TW); Michael Sokol, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1522 days.

(21) Appl. No.: 09/863,318

(22) Filed: May 24, 2001

(65) Prior Publication Data

US 2002/0069301 A1  Jun. 6, 2002

Related U.S. Application Data

(60) Provisional application No. 60/237,764, filed on Oct. 3, 2000.

(51) Int. Cl.
*H04L 12/56* (2006.01)
(52) U.S. Cl. .............................. 370/395.72; 370/395.7; 709/224
(58) Field of Classification Search .............. 370/395.7, 370/395.72, 250; 709/224
See application file for complete search history.

(56) References Cited

U.S. PATENT DOCUMENTS

| | | | |
|---|---|---|---|
| 5,278,789 A | 1/1994 | Inoue et al. |
| 5,390,173 A | 2/1995 | Spinney et al. |
| 5,414,704 A | 5/1995 | Spinney |
| 5,423,015 A | 6/1995 | Chung |
| 5,459,717 A | 10/1995 | Mullan et al. |
| 5,473,607 A | 12/1995 | Hausman et al. |
| 5,499,295 A | 3/1996 | Cooper |
| 5,524,254 A | 6/1996 | Morgan et al. |
| 5,555,398 A | 9/1996 | Raman |
| 5,568,477 A | 10/1996 | Galand et al. |
| 5,579,301 A | 11/1996 | Ganson et al. |
| 5,644,784 A | 7/1997 | Peek |
| 5,652,579 A | 7/1997 | Yamada et al. |
| 5,696,899 A | 12/1997 | Kalwitz |
| 5,742,613 A | 4/1998 | MacDonald |

(Continued)

FOREIGN PATENT DOCUMENTS

EP  0312917 A2  4/1989

(Continued)

OTHER PUBLICATIONS

"High-Speed CMOS Circuit for 1.2-Gb/s 16×16 ATM Switching," Alain Chemarin et al. 8107 IEEE Journal of Solid-State Circuits 27(Jul. 1992), No. 7, New York, US, pp. 1116-1120.

(Continued)

*Primary Examiner*—Kenneth R. Coulter
(74) *Attorney, Agent, or Firm*—Squire, Sanders & Dempsey L.L.P.

(57) ABSTRACT

A system of switches having a memory/command bus having a first interface, a second interface and a third interface. A memory is connected to the third interface of the memory/command bus. The memory has a first memory address. A first switch monitors the memory/command bus and interprets information written to the first memory address as proxy information. The first switch is connected to the first interface of the memory/command bus. The second switch monitors the memory/command bus and interprets information written to the first memory address as proxy information. The second switch is connected to the second interface of the memory/command bus.

12 Claims, 10 Drawing Sheets

U.S. PATENT DOCUMENTS

| | | | |
|---|---|---|---|
| 5,748,631 | A | 5/1998 | Bergantino et al. |
| 5,781,549 | A | 7/1998 | Dai |
| 5,787,084 | A | 7/1998 | Hoang et al. |
| 5,790,539 | A | 8/1998 | Chao et al. |
| 5,802,052 | A | 9/1998 | Venkataraman |
| 5,802,287 | A | 9/1998 | Rostoker et al. |
| 5,825,772 | A | 10/1998 | Dobbins et al. |
| 5,828,653 | A | 10/1998 | Goss |
| 5,831,980 | A | 11/1998 | Varma et al. |
| 5,842,038 | A | 11/1998 | Williams et al. |
| 5,845,081 | A | 12/1998 | Rangarajan et al. |
| 5,887,187 | A | 3/1999 | Rostoker et al. |
| 5,892,922 | A | 4/1999 | Lorenz |
| 5,898,687 | A | 4/1999 | Harriman et al. |
| 5,909,686 | A | 6/1999 | Muller et al. |
| 5,918,074 | A | 6/1999 | Wright et al. |
| 5,920,699 | A * | 7/1999 | Bare .......................... 709/225 |
| 5,940,596 | A | 8/1999 | Rajan et al. |
| 5,987,507 | A | 11/1999 | Creedon et al. |
| 6,011,795 | A | 1/2000 | Varghese et al. |
| 6,041,053 | A | 3/2000 | Douceur et al. |
| 6,041,109 | A | 3/2000 | Cardy et al. |
| 6,061,351 | A | 5/2000 | Erimli et al. |
| 6,111,858 | A * | 8/2000 | Greaves et al. .............. 370/256 |
| 6,119,196 | A | 9/2000 | Muller et al. |
| 6,151,319 | A * | 11/2000 | Dommety et al. ...... 370/395.52 |
| 6,175,902 | B1 | 1/2001 | Runaldue et al. |
| 6,185,185 | B1 | 2/2001 | Bass et al. |
| 6,636,503 | B1 * | 10/2003 | Shiran et al. ................. 370/352 |
| 6,760,341 | B1 * | 7/2004 | Erimli et al. ................. 370/412 |
| 6,832,256 | B1 * | 12/2004 | Toga ........................... 709/229 |
| 7,120,155 | B2 * | 10/2006 | Sokol et al. .............. 370/395.7 |
| 2003/0118028 | A1 * | 6/2003 | Neal et al. .............. 370/395.21 |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| EP | 1 001 571 A2 | 8/1999 |
| FR | 2 725 573 A1 | 4/1996 |
| JP | 4-189023 | 7/1992 |
| WO | WO 97/50214 | 12/1997 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

OTHER PUBLICATIONS

"Local Area Network Switch Frame Lookup Technique for Increased Speed and Flexibility," 700 IBM Technical Disclosure Bulletin 38(Jul. 1995), No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8×8 ATM Switch Chip Set with Shared Multibuffer Architecture," Harufusa Kondoh et al., 8107 IEEE Journal of Solid-State Circuits 28(Jul. 1993), No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, PRENTICE-HALL INT., USA, XP-002147300(1998), Sec. 5.2-Sec. 5.3, pp. 309-320.

* cited by examiner

METHOD AND APPARATUS OF INTER-CHIP BUS SHARED BY MESSAGE PASSING AND MEMORY ACCESS

REFERENCE TO RELATED APPLICATIONS

This application claims priority to United States Provisional Patent Application Ser. No. 60/237,764 filed on Oct. 3, 2000. The contents of this provisional application are hereby incorporated by reference.

BACKGROUND OF THE INVENTION

1. Field of the Invention

The invention relates to a method and apparatus for high performance switching in local area communications networks such as token ring, ATM, ethernet, fast ethernet, and gigabit ethernet environments, generally known as LANs. In particular, the invention relates to a new switching architecture geared to power efficient and cost sensitive markets, and which can be implemented on a semiconductor substrate such as a silicon chip.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, and Fast Ethernet is up to 100 megabits per second. A gigabit Ethernet is capable of transmitting data over a network at a rate of up to 1,000 megabits per second. As speed has increased, design constraints and design requirements have become more and more complex with respect to following appropriate design and protocol rules and providing a low cost, commercially viable solution.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The invention is directed to an inter-chip bus shared by message passing and memory access functions.

One embodiment of the invention is a system of switches. The system has a memory/command bus having a first interface, a second interface and a third interface. A memory is connected to the third interface of the memory/command bus. The memory has a first memory address. A first switch monitors the memory/command bus and interprets information written to the first memory address as proxy information. The first switch is connected to the first interface of the memory/command bus. The second switch monitors the memory/command bus and interprets information written to the first memory address as proxy information. The second switch is connected to the second interface of the memory/command bus.

Another embodiment of the invention is a switch having a memory/command bus interface. The memory/command bus interface is configured to be connected to a memory and a second switch through a memory/command bus. The memory has a designated memory address. A monitor is connected to the memory command bus interface so that the monitor can monitor the memory command bus and interpret information written to the designated memory location as proxy information.

In another embodiment, the invention is a method of sending information between switches using a shared memory/command bus connecting switches to one another and to a shared memory. The method has the steps of allocating a first address in a shared memory for communicating information between switches; obtaining ownership of a memory/command bus for a first switch; writing memory information to the shared memory from the first switch; writing sending information, to be sent to other switches, to the first address in the shared memory; monitoring of the memory/command bus by the first switch and the other switches; and interpreting the sending information written to the first address as proxy information.

BRIEF DESCRIPTION OF THE DRAWINGS

The objects and features of the invention will be more readily understood with reference to the following description and the attached drawings, wherein.

DETAILED DESCRIPTION OF THE INVENTION

Figure 1:
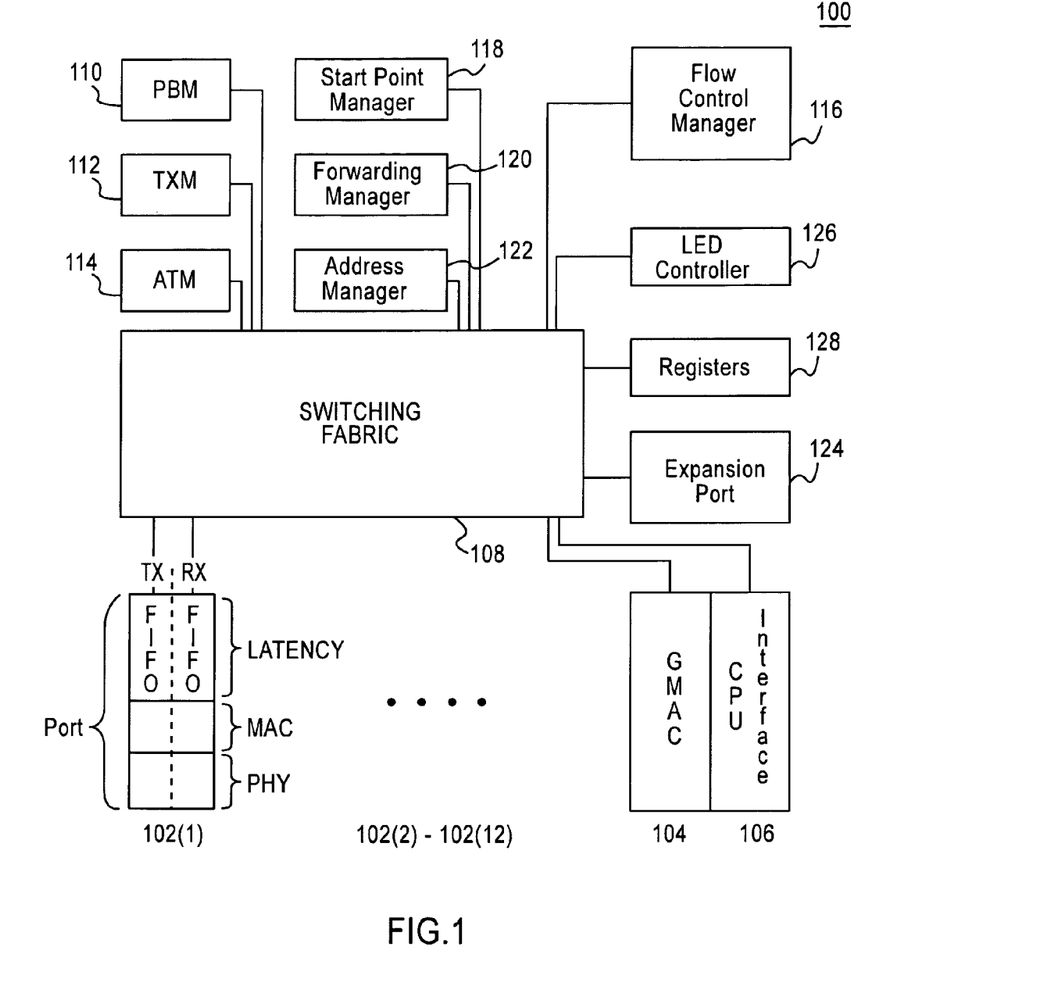
FIG. 1 is a general block diagram of elements of the present invention.

FIG. 1 is an example of a block diagram of a switch 100 of the present invention. In this example, switch 100 has 12 ports, 102(1)-102(12), which can be fully integrated IEEE compliant ports. Each of these 12 ports 102(1)-102(12) can be 10BASE-T/100BASE-TX/FX ports each having a physical element (PHY), which can be compliant with IEEE standards. Each of the ports 102(1)-102(12), in one example of the invention, has a port speed that can be forced to a particular configuration or set so that auto-negotiation will determine the optimal speed for each port independently. Each PHY of each of the ports can be connected to a twisted-pair interface using TXOP/N and RXIP/N as transmit and receive protocols, or a fiber interface using FXOP/N and FXIP/N as transmit and receive protocols.

Each of the ports 102(1)-102(12) has a Media Access Controller (MAC) connected to each corresponding PHY. In one example of the invention, each MAC is a fully compliant IEEE 802.3 MAC. Each MAC can operate at 10 Mbps or 100 Mbps and supports both a full-duplex mode, which allows for data transmission and reception simultaneously, and a half duplex mode, which allows data to be either transmitted or received, but not both at the same time.

Flow control is provided by each of the MACs. When flow control is implemented, the flow of incoming data packets is managed or controlled to reduce the chances of system resources being exhausted. Although the present embodiment can be a non-blocking, wire speed switch, the memory space available may limit data transmission speeds. For example, during periods of packet flooding (i.e. packet broadcast storms), the available memory can be exhausted rather quickly. In order to enhance the operability of the switch in these types of situations, the present invention can implement two different types of flow control. In full-duplex mode, the present invention can, for example, implement the IEEE 802.3x flow control. In half-duplex mode, the present invention can implement a collision backpressure scheme.

In one example of the present invention each port has a latency block connected to the MAC. Each of the latency blocks has transmit and receive FIFOs which provide an interface to main packet memory. In this example, if a packet does not successfully transmit from one port to another port within a preset time, the packet will be dropped from the transmit queue.

In addition to ports 102(1)-102(12), a gigabit interface 104 can be provided on switch 100. Gigabit interface 104 can support a Gigabit Media-Independent Interface (GMII) and a Ten Bit Interface (TBI). The GMII can be fully compliant to IEEE 802.3ab. The GMII can pass data at a rate of 8 bits every 8 ns resulting in a throughput of 2 Gbps including both transmit and receive data. In addition to the GMII, gigabit interface 104 can be configured to be a TBI, which is compatible with many industry standard fiber drivers. Since in some embodiments of the invention the MDIO/MDC interfaces (optical interfaces) are not supported, the gigabit PHY (physical layer) is set into the proper mode by the system designer.

Gigabit interface 140, like ports 102(1)-102(12), has a PHY, a Gigabit Media Access Controller (GMAC) and a latency block. The GMAC can be a fully compliant IEEE 802.3z MAC operating at 1 Gbps full-duplex only and can connect to a fully compliant GMII or TBI interface through the PHY. In this example, GMAC 108 provides full-duplex flow control mechanisms and a low cost stacking solution for either twisted pair or TBI mode using in-band signaling for management. This low cost stacking solution allows for a ring structure to connect each switch utilizing only one gigabit port.

A CPU interface 106 is provided on switch 100. In one example of the present invention, CPU interface 106 is an asynchronous 8 or 16 bit I/O device interface. Through this interface a CPU can read internal registers, receive packets, transmit packets and allow for interrupts. CPU interface 106 also allows for a Spanning Tree Protocol to be implemented. In one example of the present invention, a chip select pin is available allowing a single CPU control two switches. In this example an interrupt pin when driven low (i.e., driven to the active state) requiring a pull-up resistor will allow multiple switches to be controlled by a single CPU.

A switching fabric 108 is also located on switch 100 in one example of the present invention. Switching fabric 108 can allow for full wire speed operation of all ports. A hybrid or virtual shared memory approach can also be implemented to minimize bandwidth and memory requirements. This architecture allows for efficient and low latency transfer of packets through the switch and also supports address learning and aging features, VLAN, port trunking and port mirroring.

Memory interfaces 110, 112 and 114 can be located on switch 100 and allow for the separation of data and control information. Packet buffer memory interface (PBM) 110 handles packet data storage while the transmit queue memory interface (TXM) 112 keeps a list of packets to be transmitted and address table/control memory interface (ATM) 114 handles the address table and header information. Each of these interfaces can use memory such as SSRAM that can be configured in various total amounts and chip sizes.

PBM 110 is located on switch 100 and can have an external packet buffer memory (not shown) that is used to store the packet during switching operations. In one example of the invention, packet buffer memory is made up of multiple 256 byte buffers. Therefore, one packet may span several buffers within memory. This structure allows for efficient memory usage and minimizes bandwidth overhead. The packet buffer memory can be configurable so that up to 4 Mbytes of memory per chip can be used for a total of 8 Mbytes per 24+2 ports. In this example, efficient memory usage is maintained by allocating 256 byte blocks, which allows storage for up to 32K packets. PBM 110 can be 64 bits wide and can use either a 64 bit wide memory or two 32 bit wide memories and can run at 100 MHz.

TXM 112 is located on switch 100 and can have an external transmit queue memory (not shown). TXM 112, in this example, maintains 4 priority queues per port and allows for 64K packets per chip and up to 128K packets per system. TXM 112 can run at a speed of up to 100 MHz.

ATM 114 can be located on switch 100 and can have an external address table/control memory (not shown) used to store the address table and header information corresponding to each 256 byte section of PBM 110. Address table/control memory allows up to 16K unique unicast addresses. The remaining available memory is used for control information. ATM 114, in this example, runs up to 133 MHz.

Switch 100, in one example of the invention, has a Flow Control Manager 116 that manages the flow of packet data. As each port sends more and more data to the switch, Flow Control Manager 116 can monitor the amount of memory being used by each port 102(1)-102(12) of switch 100 and the switch as a whole. In this example, if one of the ports 102(1)-102(12) or the switch as a whole is using up too much memory as is predetermined by a register setting predefined by the manufacturer or by a user, Flow Control Manager 116 will issue commands over the ATM Bus requesting the port or switch to slow down and may eventually drop packets if necessary.

In addition to Flow control manager 116, switch 100 also has a Start Point Manager (SPM) 118 connected to Switching Fabric 108, a Forwarding Manager (FM) 120 connected to Switching Fabric 108 and an Address Manager (AM) 122 connected to Switching Fabric 108.

Start Point Manager (SPM) 118, through Switching Fabric 108 in one example of the present invention, keeps track of which blocks of memory in PBM 110 are being used and which blocks of memory are free.

Forwarding Manager 120 can, for example, forward packet data through Switching Fabric 108 to appropriate ports for transmission.

Address Manager (AM) 122 can, through Switching Fabric 108, manage the address table including learning source addresses, assigning headers to packets and keeping track of these addresses. In one example of the invention, AM 122 uses aging to remove addresses from the address table that have not been used for a specified time period or after a sequence of events.

An expansion port 124 can also be provided on switch 100 to connect two switches together. This will allow for full wire speed operation on twenty-five 100 M ports (includes one CPU port) and two gigabit ports. The expansion port 124, in this example, allows for 4.6 Gbps of data to be transmitted between switches.

An LED controller 126 can also be provided on switch 100. LED controller 126 activates appropriate LEDs to give a user necessary status information. Each port of the ports 102(1)-102(12), in one example of the invention, has 4 separate LEDs, which provide per port status information. The LEDs are fully programmable and are made up of port LEDs and other LEDs. Each LED can include a default state for each of the four port LEDs. An example of the default operation of each of the port LEDs are shown below.

| LED | DEFAULT OPERATION |
|---|---|
| 0 | Speed Indicator |
|   | OFF = 10 Mbps or no link |
|   | ON = 100 Mbps |
| 1 | Full/Half/Collision Duplex |
|   | OFF = The port is in half duplex or no link |
|   | BLINK = The port is in half duplex and a collision has occurred |
|   | ON = The port is in full duplex |
| 2 | Link/Activity Indicator |
|   | OFF = Indicates that the port does not have link |
|   | BLINK = Link is present and receive or transmit activity is occurring on the media |
|   | ON = Link present without activity |
| 3 | Alert Condition |
|   | OFF = No alert conditions, port is operating normally |
|   | ON = The port has detected an isolate condition |

In addition to the default operations for the port LEDs, each of the port LEDs can be programmed through registers. These registers can be set up, in one example of the invention, by a CPU. By having programmable registers that control LEDs, full customization of the system architecture can be realized including the programmability of the blink rate.

Each of the LEDs can have a table, as shown below, associated with the LED, where register bits $R_{Ax}$, $R_{Bx}$ and $R_{Cx}$ can be set to provide a wide range of information.

| Event | ON Condition | BLINK Condition | OFF Condition |
|---|---|---|---|
| Link (L) | $A_0=(R_{A0}\&L) \mid !R_{A0}$ | $B_0=(R_{B0}\&L) \mid !R_{B0}$ | $C_0=(R_{C0}\&L) \mid !R_{C0}$ |
| Isolate (I) | $A_1=(R_{A1}\&I) \mid !R_{A1}$ | $B_1=(R_{B1}\&I) \mid !R_{B1}$ | $C_1=(R_{C1}\&I) \mid !R_{C1}$ |
| Speed (S) | $A_2=(R_{A2}\&S) \mid !R_{A2}$ | $B_2=(R_{B2}\&S) \mid !R_{B2}$ | $C_2=(R_{C2}\&S) \mid !R_{C2}$ |
| Duplex (D) | $A_3=(R_{A3}\&D) \mid !R_{A3}$ | $B_3=(R_{B3}\&D) \mid !R_{B3}$ | $C_3=(R_{C3}\&D) \mid !R_{C3}$ |
| TX/RX Activity (TRA) | $A_4=(R_{A4}\&TRA) \mid !R_{A4}$ | $B_4=(R_{B4}\&TRA) \mid !R_{B4}$ | $C_4=(R_{C4}\&TRA) \mid !R_{C4}$ |
| TX Activity (TA) | $A_5=(R_{A5}\&TA) \mid !R_{A5}$ | $B_5=(R_{B5}\&TA) \mid !R_{B5}$ | $C_5=(R_{C5}\&TA) \mid !R_{C5}$ |
| RX Activity (RA) | $A_6=(R_{A6}\&RA) \mid !R_{A6}$ | $B_5=(R_{B6}\&RA) \mid !R_{B6}$ | $C_6(R_{C6}\&RA) \mid !R_{C6}$ |
| Auto-Negotiate Active (N) | $A_7=(R_{A7}\&N) \mid !R_{A7}$ | $B_7=(R_{B7}\&N) \mid !R_{B7}$ | $C_7=(R_{C7}\&N) \mid !R_{C7}$ |
| Port Disabled (PD) | $A_8=(R_{A8}\&PD) \mid !R_{A8}$ | $B_8=(R_{B8}\&PD) \mid !R_{B8}$ | $C_8=(R_{C8}\&PD) \mid !R_{C8}$ |
| Collision © | $A_9=(R_{A9}\&C) \mid !R_{A9}$ | $B_9=(R_{B9}\&C) \mid !R_{B9}$ | $C_9(R_{C9}\&C) \mid !R_{C9}$ |
| Result | $LED_{ON}=(A_0\&A_1\&A_2\&\underline{A}_3\&A_4\&A_5\&A_6\&A_7\&A_8\&\overline{A_9})\&(\overline{LED_{BLINK}}\&\overline{LED_{OFF}})$ | $LED_{BLINK}=(B_0\&B_1\&B_2\&B_3\&B_4\&B_5\&B_6\&B_7\&\bar{B}_8\&B_9)\&\overline{LED_{OFF}}$ | $LED_{OFF}=(C_0\&C_1\&C_2\&C_3\&C_4\&C_5\&C_6\&C_7\&C_8\&C_9)$ |

For example, register bits $R_{Ax}$, $R_{Bx}$ and $R_{Cx}$ can be set to determine when $LED_{ON}$, $LED_{BLINK}$ and $LED_{OFF}$ are activated or deactivated. In addition to the port LEDs, there are additional LEDs which indicate the status of the switch.

Registers 128 are located on switch 100 in this example of the present invention. Registers 128 are full registers that allow for configuration, status and Remote Monitoring (RMON) management. In this example, Registers 128 are arranged into groups and offsets. There are 32 address groups each of which can contain up to 64 registers.

Figure 2:
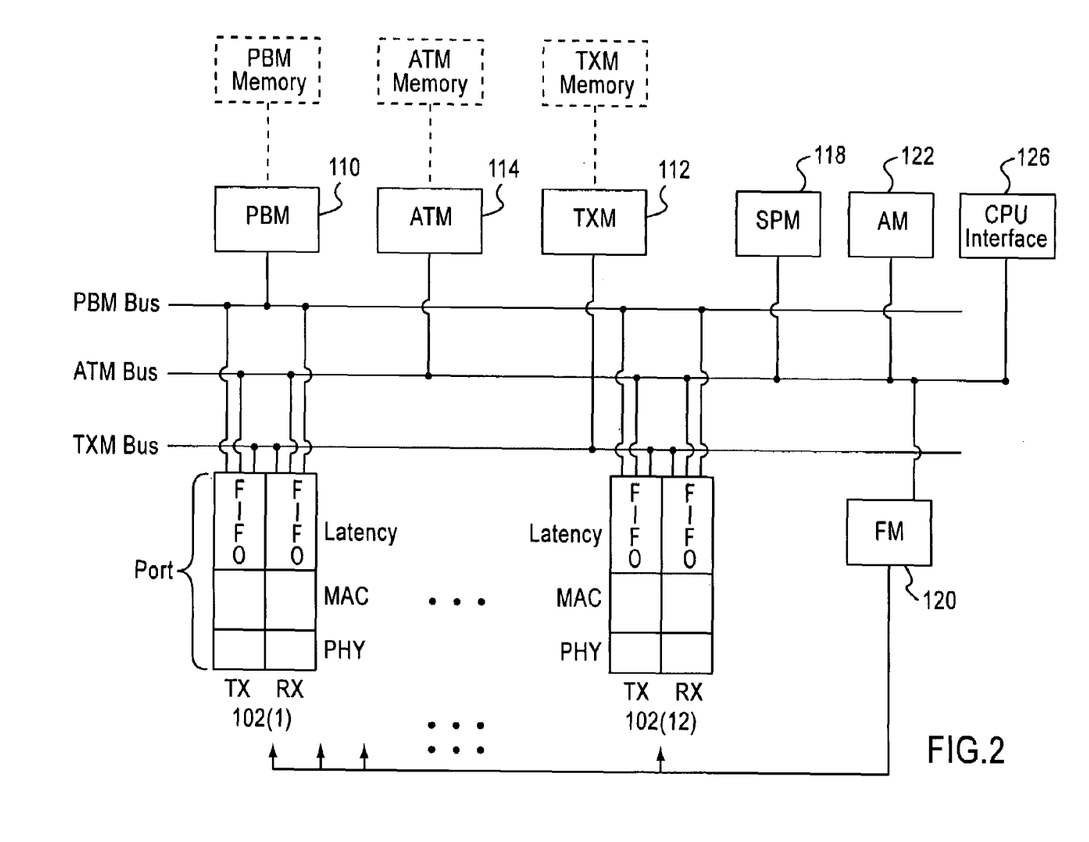
FIG. 2 is a general block diagram of a bus architecture of a network switch according to the present invention.

FIG. 2 is an illustration of one embodiment of the invention having a PBM Bus, an ATM Bus, and a TXM Bus for communications with other portions of the switch. In this example PBM 110 is connected to the PBM Bus and an external PBM Memory; TXM 112 is connected to the TXM Bus and an external TXM Memory; and ATM 114 is connected to the ATM Bus and an external ATM Memory. Each of the transmit (TX) and receive (RX) portions of ports 102(1)-102(12) are connected to the PBM Bus, ATM Bus and TXM Bus for communications.

FM 120 is connected to each of the ports 102(1)-102(12) directly and is also connected to the ATM Bus for communications with other portions of the switch. SPM 118 and AM 122 are also connected to the ATM Bus for communications with other portions of the switch.

The operation of switch 100 for transmission of a unicast packet (i.e., a packet destined for a single port for output) in one example of the invention is made with reference to FIG. 2 as follows.

In this example, Switch 100 is initialized following the release of a hardware reset pin. A series of initialization steps will occur including the initialization of external buffer memory and the address table. All ports on the switch will then be disabled and the CPU will enable packet traffic by setting an enable register. As links become available on the ports (ports 102(1)-102(12) and gigabit port 104), an SPT protocol will confirm these ports and the ports will become activated. After the initialization process is concluded normal operation of Switch 100 can begin.

In this example, once a port has been initialized and activated, a PORT_ACTIVE command is enabled. This indicates that the port is ready to transmit and receive data packets. If for some reason a port goes down or becomes disabled, a PORT_INACTIVE command is enabled.

During unicast transmission, a packet from an external source on port 102(1) is received at the receive (RX) PHY of port 102(1).

In this example, the RX MAC of port 102(1) will not start processing the packet until a Start of Frame Delimiter (SFD) for the packet is detected. When the SFD is detected by the RX MAC portion of port 102(1), the RX MAC will place the packet into a receive (RX) FIFO of the latency block of port 102(1). As the RX FIFO becomes filled, port 102(1) will request an empty receive buffer from the SPM. Once access to the ATM Bus is granted, the RX FIFO Latency block of port 102(1) sends packets received in the RX FIFO to the external PBM Memory through the PBM Bus and PBM 110 until the end of packet is reached.

The PBM Memory, in this example, is made up of 256 byte buffers. Therefore, one packet may span several buffers within the packet buffer memory if the packet size is greater than 256 bytes. Connections between packet buffers can be maintained through a linked list system in one example of the present invention. A linked list system allows for efficient memory usage and minimized bandwidth overhead and will be explained in further detail with relation to FIG. 3A-FIG. 3D.

At the same time packets are being sent to the external PBM Memory, the port will also send the source address to Address Manager (AM) 122 and request a filtering table from AM 122.

If the packet is "good", as is determined through normal, standard procedures known to those of ordinary skill in the art, such as valid length and IEEE standard packet checking such as a Cyclic Redundancy Check, the port writes the header information to the ATM memory through the ATM Bus and ATM 114. AM 122 sends a RECEP_COMPL command over the ATM Bus signifying that packet reception is complete. Other information is also sent along with the RECEP_COMPL command such as the start address and filtering table which indicates which ports the packet is to be sent out on. For example, a filtering table having a string such as "011111111111" would send the packet to all ports except port 1 and would have a count of 11. The count simply is the number of ports the packet is to be sent, as indicated by the number of "1"s.

Forwarding Manager (FM) 120 is constantly monitoring the ATM Bus to determine if a RECEP_COMPL command has been issued. Once FM 120 has determined that a RECEP_COMPL command has been issued, Forwarding Manager (FM) 120 will use the filtering table to send packets to appropriate ports. It is noted that a packet will not be forwarded if one of the following conditions is met:
 a. The packet contains a CRC error
 b. The PHY signals a receive error
 c. The packet is less than 64 bytes
 d. The packet is greater than 1518 bytes or 1522 bytes depending on register settings
 e. The packet is only forwarded to the receiving port The RECEP_COMPL command includes information such as a filter table, a start pointer, priority information and other miscellaneous information. FM 120 will read the filter table to determine if the packet is to be transmitted from one of its ports. If it is determined that the packet is to be transmitted from one of its ports, FM 120 will send the RECEP_COMPL command information directly to the port. In this case, the RECEP_COMPL command information is sent to the TX FIFO of port 102(12).

If the port is busy, the RECEP_COMPL command information is transferred to TXM Memory through the TXM Bus and TXM 112. The TXM memory contains a queue of packets to be transmitted. TXM Memory is allocated on a per port basis so that if there are ten ports there are ten queues within the TXM Memory allocated to each port. As each of the ports transmitters becomes idle, each port will read the next RECEP_COMPL command information stored in the TXM Memory. The TX FIFO of port 102(12) will receive, as part of the RECEP_COMPL command information, a start pointer which will point to a header in ATM memory across the ATM Bus which in turn points to the location of a packet in the PBM Memory over the PBM Bus. The port will at this point request to load the packet into the transmit (TX) FIFO of port 102(12) and send it out through the MAC and PHY of port 102(12).

If the port is in half duplex mode, it is possible that a collision could occur and force the packet transmission to start over. If this occurs, the port simply re-requests the bus master and reloads the packet and starts over again. If however, the number of consecutive collisions becomes excessive, the packet will be dropped from the transmission queue.

Once the port successfully transmits a packet, the port will signal FM 120 that it is done with the current buffer. FM 120 will then decrement a counter which indicates how many more ports must transmit the packet. For example, if a packet is destined to eleven ports for output, the counter, in this example, is set to 11. Each time a packet is successfully transmitted, FM 120 decrements the counter by one. When the counter reaches zero this will indicate that all designated ports have successfully transmitted the packet. FM 120 will then issue a FREE command over the ATM Bus indicating that the memory occupied by the packet in the PBM Memory is no longer needed and can now be freed for other use.

When SPM 118 detects a FREE command over the ATM Bus, steps are taken to indicate that the space taken by the packet is now free memory.

Multicast and broadcast packets are handled exactly like unicast packets with the exception that their filter tables will indicate that all or most ports should transmit the packet. This will force the forwarding managers to transmit the packet out on all or most of their ports.

Figure 3A:
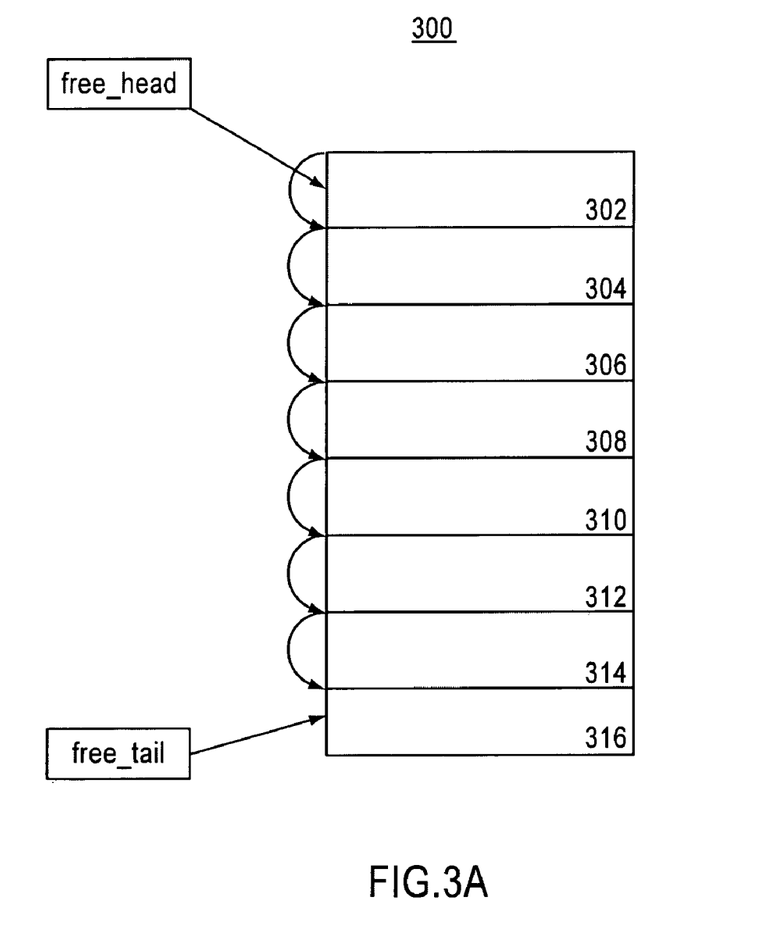
FIG. 3A illustrates a linked list structure of Packet Buffer Memory.

FIG. 3A is an illustration of a PBM Memory structure in one example of the invention. PBM Memory Structure 300 is a linked list of 256 byte segments 302, 304, 306, 308, 310, 312, 314 and 316. In this example segment 302 is the free_head indicating the beginning of the free memory linked list and segment 316 is the free_tail indicating the last segment of free memory.

Figure 3B:
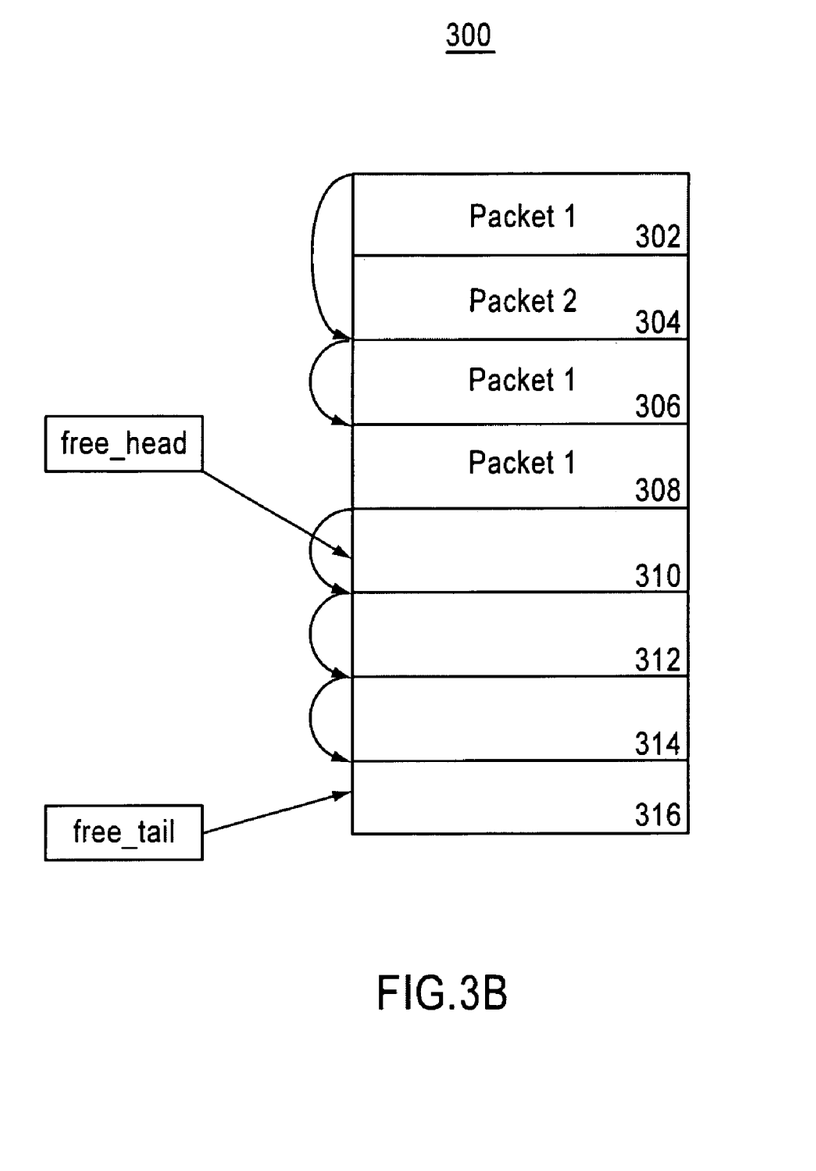
FIG. 3B illustrates a linked list structure of Packet Buffer Memory with two data packets.

In FIG. 3B two packets have been received and stored in the PBM Memory. Packet 1 occupies segments 302, 306 and 308 and packet 2 occupies segment 304. Segments 310, 312, 314 and 316 are free memory. Segment 310 is the free_head indicating the beginning of free memory and segment 316 is the free_tail indicating the end of free memory.

Figure 3C:
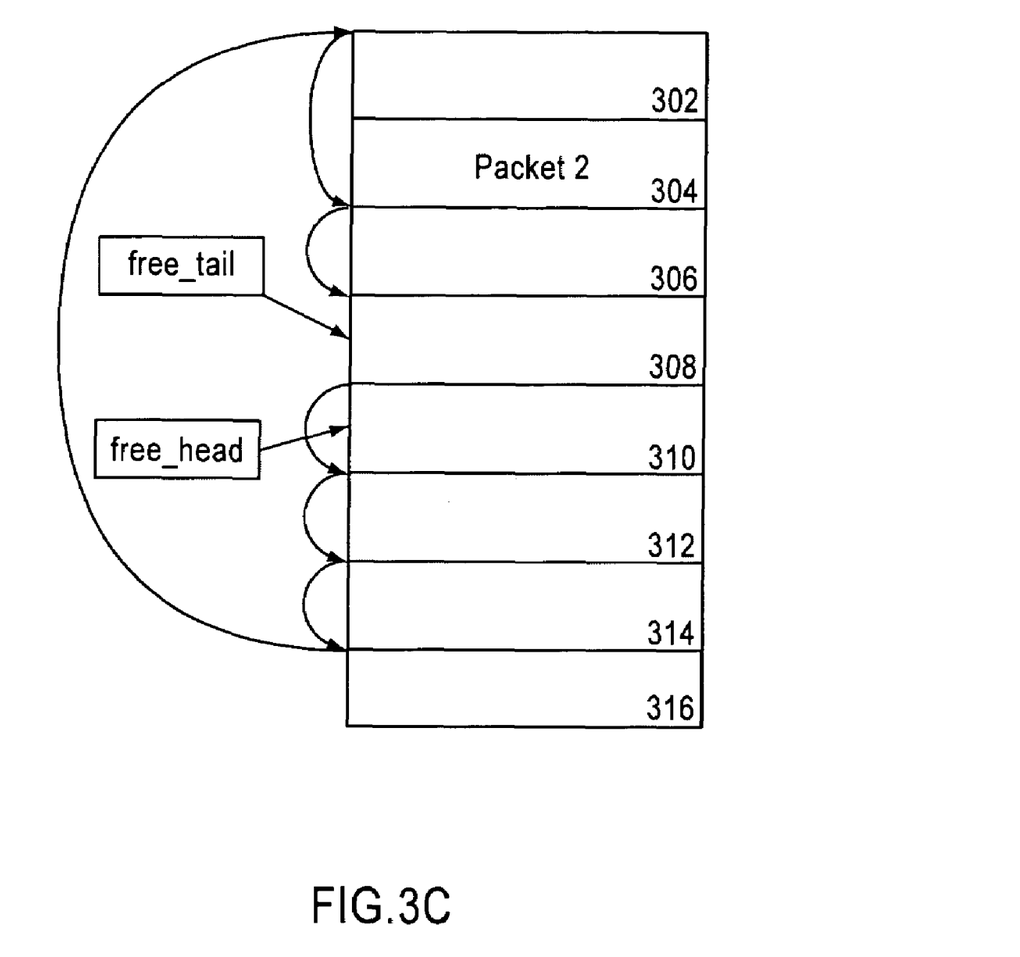
FIG. 3C illustrates a linked list structure of Packet Buffer Memory after the memory occupied by one data packet is freed.

In FIG. 3C packet 1 has been fully transmitted and the Forwarding Manager (FM) has issued a FREE command. Since packet 1 is already in a linked list format the SPM can add the memory occupied by packet 1 to the free memory link list. The free_head, segment 310 remains the same. However, the free_tail is changed. This is accomplished by linking segment 316 to the beginning of packet 1, segment 302, and designating the last segment of packet 1, segment 308, as the free_tail. As a result, there is a linked list starting with segment 310 linking to segment 312, segment 312 linking to segment 314, segment 314 linking to segment 316, segment 316 linking to segment 302, segment 302 linking to segment 306 and segment 306 linking to segment 308 where segment 308 is the free_tail.

Figure 3D:
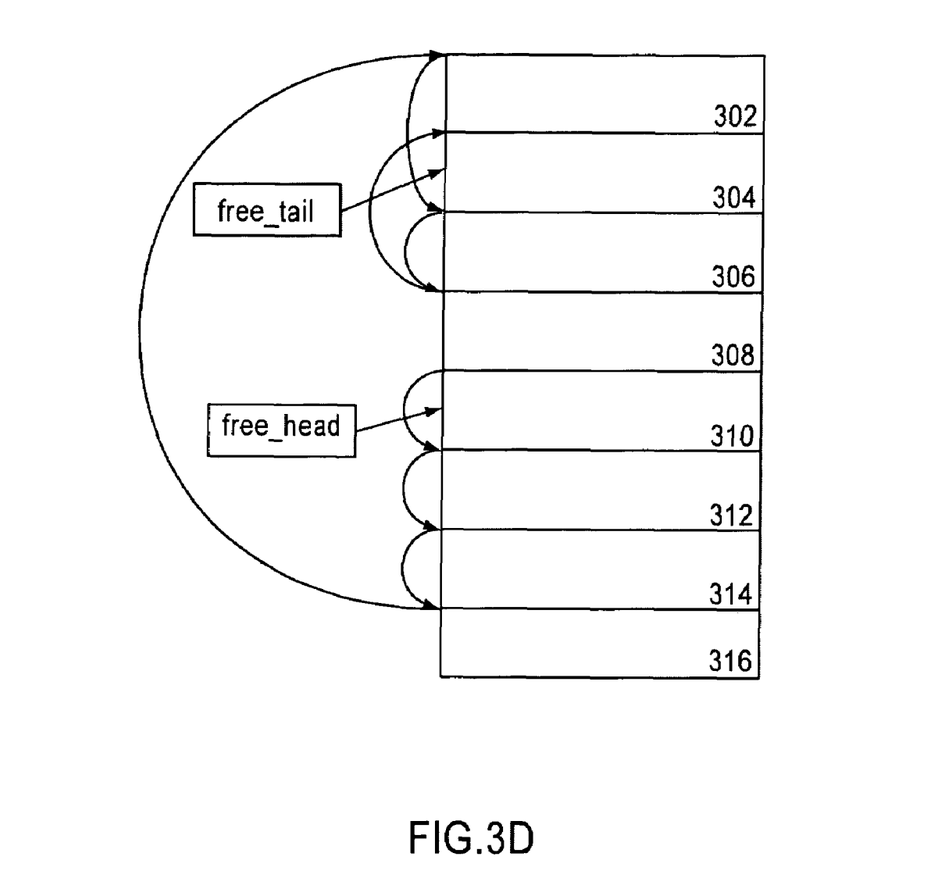
FIG. 3D illustrates a linked list structure of Packet Buffer Memory after the memory occupied by another data packet is freed.

FIG. 3D in this example simply illustrates the PBM Memory after packet 2 has been transmitted successfully and the Forwarding Manager has issued a FREE command over the ATM Bus. The SPM will detect the FREE command and then add the memory space occupied by packet 2 in the PBM Memory to the free memory linked list. In this example segment 308 is linked to the memory occupied by packet 2, segment 304, and segment 304 is identified as the free_tail.

Figure 4:
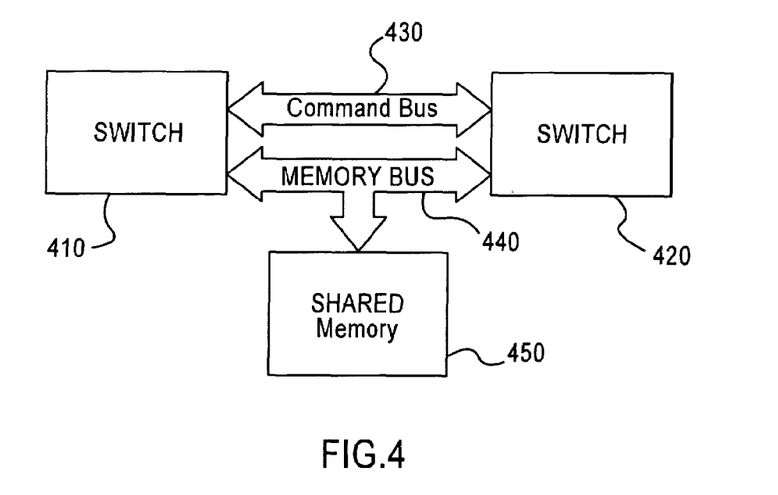
FIG. 4 illustrates two switches having shared memory and connected to each other by a command bus and memory bus.

FIG. 4 is a block diagram of a Switch 410 connected to a Switch 420 by a Command Bus 430. A Memory Bus 440 connects Switch 410 to Switch 420 and also connects Switch 410 and Switch 420 to a Shared Memory 450. In the configuration illustrated in FIG. 4, Command Bus 430 is used to transmit commands between Switch 410 and Switch 420. Memory Bus 440 is used to read and write data to Shared Memory 450 from Switch 410 and Switch 420. Thus, Command Bus 430 is for the transmission of commands between switches and Memory Bus 440 is for the transmission of data to Shared Memory 450. In order to decrease the number of pins used on a switch and in order to decrease the electrical load on a switch, the configuration illustrated in FIG. 4 can be modified.

Figure 5:
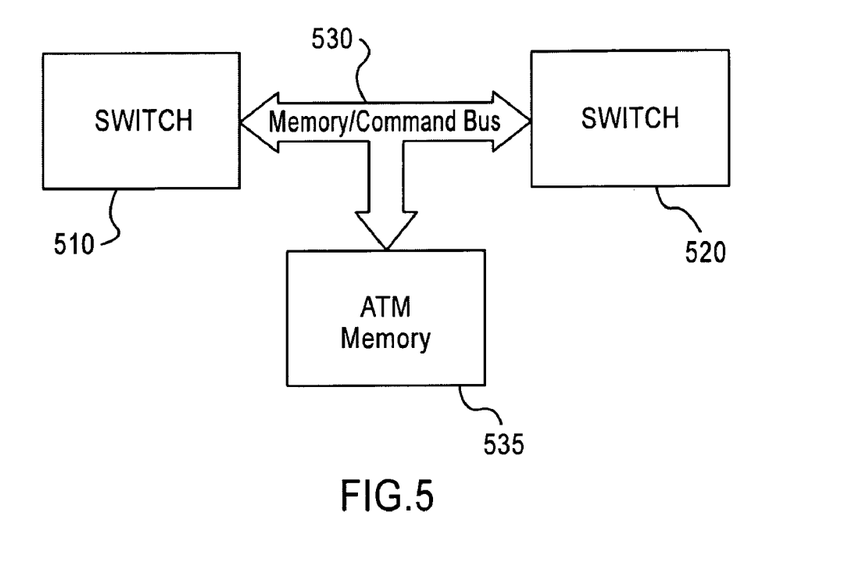
FIG. 5 illustrates two switches having shared memory and connected to each other by a memory/command bus.

FIG. 5 is an illustration of one configuration where commands can be passed between chips through a memory bus without the use of extra pins, which in effect eliminates the need for Command Bus 430 as illustrated in FIG. 4. The configuration in this example as illustrated in FIG. 5 has a Switch 510 and a Switch 520. A Memory/Command Bus 530 connects Switch 510 to Switch 520. Memory/Command Bus 530 also connects Switch 510 and Switch 520 to ATM Memory 535.

The operation of the example as illustrated in FIG. 5 is as follows. During normal reads from the memory, Switch 510 or Switch 520 can access ATM Memory 535 using Memory/Command Bus 530. Similarly, when either Switch 510 or Switch 520 writes to ATM Memory 535, the data is written to ATM Memory 535 through Memory/Command Bus 530.

However, during a write to ATM Memory 535, Memory/Command Bus 530 can also be used to send commands between Switch 510 and Switch 520. This is accomplished by writing information or commands during write cycles to a specific address A in ATM Memory 535. All switches, in this case Switch 510 and Switch 520, can recognize write commands on Memory/Command Bus 530 at all times. Switch 510 and Switch 520 will recognize write operations to address A as a command during a write cycle. Information written to address A is called proxy information. Proxy information is defined as information written to memory, which is not interpreted by a switch interpreting this information as information being written to memory. Instead the switch interprets proxy information being written to memory as a command, status information that a switch may use to set a register or an LED, or other types of information not typically written to memory.

Address A will be used like a blackboard on which every command operation always writes to address A of ATM Memory 535. However, when data is read, Switch 510 and Switch 520, in this example, know that there is proxy information stored in address A of ATM Memory 535 and not the typical information usually stored in a memory. Thus, in some cases command operations can be achieved at the expense of one void address A.

During write operations to ATM Memory 535, all information written to ATM Memory 535 is of the type typically written to memory except for the information written to address A which is called proxy information. All information written to address A of ATM Memory 535 (i.e. proxy information) can be recognized as a command, status information that a switch may use to set a register or an LED or other types of information not typically written to memory, to any switches connected to Memory/Command Bus 530. The switches connected to Memory/Command Bus 530 listen to all writes to address A and can use this proxy information as a command, status information that a switch may use to set a register or an LED, or other types of information not typically written to memory. Thus, the switches will ignore all writes to memory locations in ATM Memory 535 other than memory address A in which proxy information will be written to.

In one example of the invention, Memory/Command Bus 535 is bi-directional and is driven by all switches connected to Memory/Command Bus 535. To avoid conflicts on Memory/Command Bus 535 between Switch 510 and Switch 520, the switch with the lowest ID is indicated as the master, which drives a syn_token signal to the other switches, Switch 520 in this example, called the slaves.

Temporary ownership of the Memory/Command Bus 535 is decided by a Time Division Multiplexer (TDM). When a switch gains ownership of Memory/Command Bus 535, the switch can drive Memory/Command Bus 535. While the switch is driving Memory/Command Bus 535, the other switches monitor the information being transferred on Memory/Command Bus 535. Thus, as discussed above, switches will ignore all information written to ATM Memory 535, unless information is written to address A, in which case the switches will treat the information as a command, status information that a switch may use to set a register or an LED, or other types of information not typically written to memory and act accordingly.

In one embodiment of the invention Switch 510 and Switch 520 each have a memory/command bus interface that does not interpret information written to address A as information being written to memory. Instead this information is interpreted as being a command, status information that a switch may use to set a register or an LED, or other types of information not typically written to memory.

Figure 6:
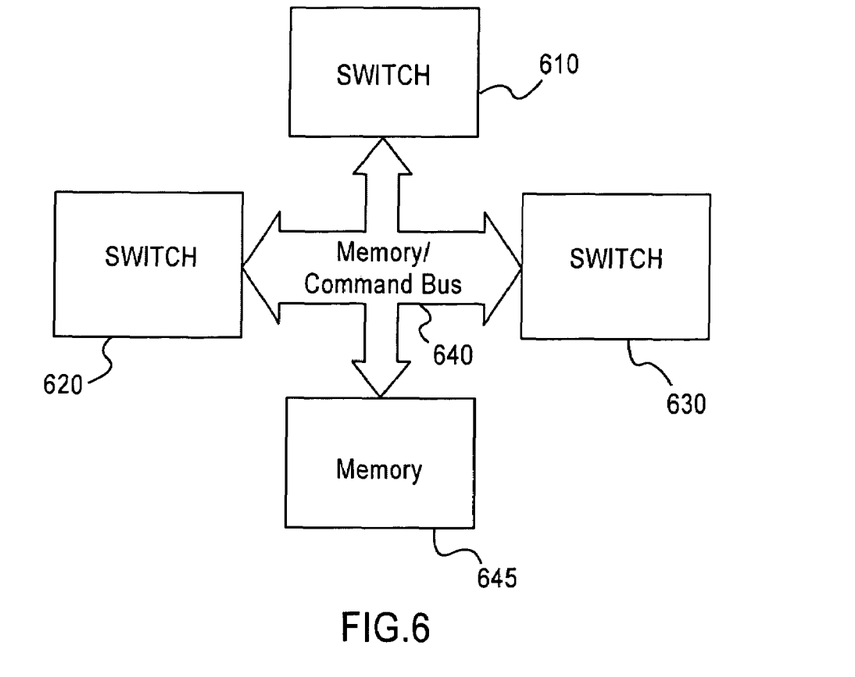
FIG. 6 illustrates a plurality of switches having shared memory and connected to each other by a memory/command bus.

FIG. 6 is simply an illustration of another embodiment of the invention having a plurality of switches connected to a memory/command bus and ATM memory. Switch 610, Switch 620 and Switch 630 are all connected to one another through Memory/Command Bus 640. Memory 645 is connected to each of the switches, Switch 610, Switch 620 and Switch 630, through Memory/Command Bus 640. The operation of switches is the same as discussed above in relation to FIG. 5, except in this case there is an additional switch involved.

Figure 7:
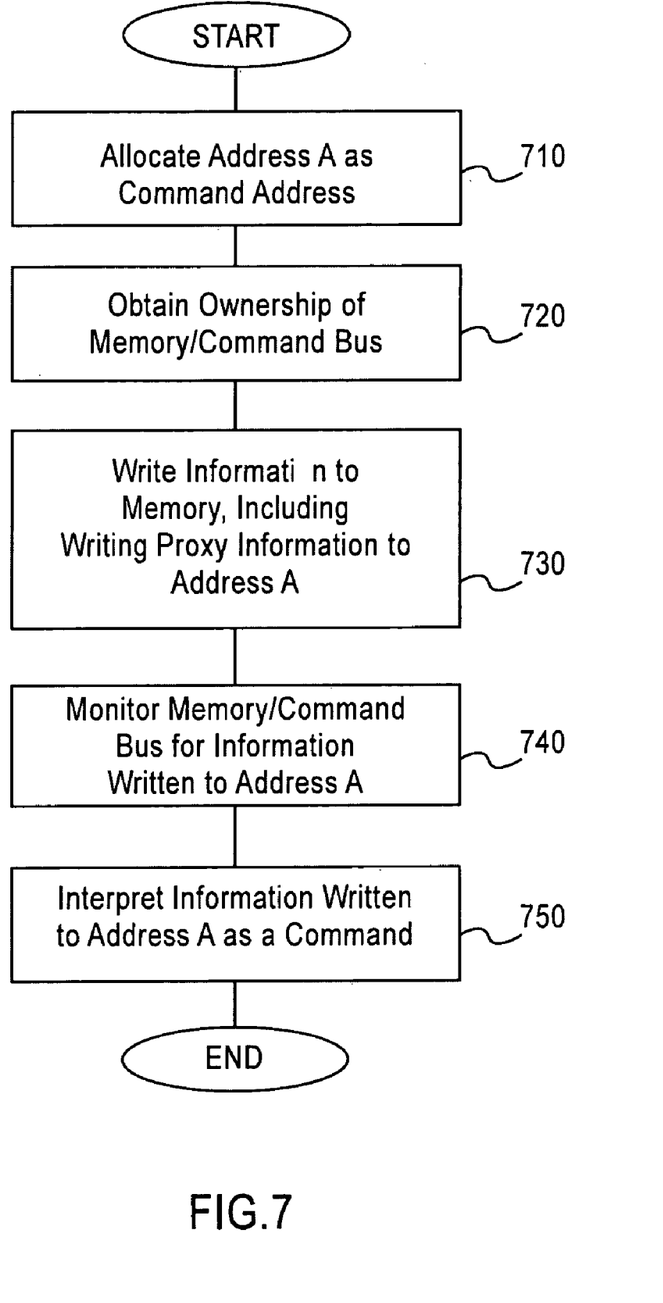
FIG. 7 is a flow diagram of steps used in inter-bus sharing for message passing and memory access.

FIG. 7 is a flow diagram illustrating the steps of sending proxy information between or among switches using a memory/command bus. FIG. 7 will be described below with reference to FIG. 5.

In step 710 an address A is allocated in ATM Memory 535 as a command address. Therefore, any information written to address A will be interpreted by a switch to be proxy information.

In step 720 Switch 510 obtains ownership of Memory/Command Bus 530, allowing Switch 510 to read and write to ATM Memory 535.

In step 730 Switch 510 writes information to ATM Memory 535, including writing proxy information to address A in ATM Memory 535. This command is intended to be sent to Switch 520.

In step 740 Switch 510 and Switch 520 are monitoring Memory/Command Bus 530 for any information being written to address A of ATM Memory 535.

In step 750 when information is being written to address A of ATM Memory 535, Switch 510 and Switch 520 interpret the information written to address A of ATM Memory 535 as proxy information (i.e. a command, status information that a switch may use to set a register or an LED, or other types of information not typically written to memory).

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A switch comprising:
   a memory/command bus interface, said memory/command bus interface configured to be connected to a memory and a second switch through a memory/command bus, said memory having a designated memory address;
   a monitor being connected to said memory/command bus interface so that said monitor can monitor said memory/command bus and interpret information written to said designated memory address as proxy information.

2. The switch as recited in claim 1 wherein said proxy information is interpreted as a command.

3. The switch as recited in claim 1 wherein said proxy information is interpreted as status information.

4. The switch as recited in claim 1 wherein said monitor is a forwarding manager.

5. The switch as recited in claim 1 wherein said monitor is an address manager.

6. The switch as recited in claim 1 wherein said monitor is a start point manager.

7. A system of switches, said system comprising:
   a memory/command bus having a first interface, a second interface and a third interface;
   a memory connected to said third interface of said memory/command bus, said memory having a first memory address;
   a first switch that monitors said memory/command bus and interprets information written to said first memory address as proxy information, said first switch connected to said first interface of said memory/command bus; and
   a second switch that monitors said memory/command bus and interprets information written to said first memory address as proxy information, said second switch connected to said second interface of said memory/command bus.

8. The system as recited in claim 1 wherein said information being written to said first memory address is interpreted as a command.

9. The system as recited in claim 1 wherein said information being written to said first memory address is interpreted as status information.

10. A method of sending information between switches using a shared memory/command bus connecting the switches to one another and to a shared memory comprising the steps of:
    allocating a first address in the shared memory for communicating information between switches;
    obtaining ownership of the memory/command bus for a first switch;
    writing memory information to said shared memory from said first switch;

writing sending information, to be sent to other switches, to said first address in said shared memory;

monitoring of said memory/command bus by said first switch and said other switches; and interpreting said sending information written to said first address as proxy information.

11. The method as recited in claim 10 further comprising the step of interpreting said sending information as a command.

12. The method as recited in claim 10 further comprising the step of interpreting said sending information as status information.

* * * * *